United States Patent [19]

Hash et al.

[11] Patent Number: 5,154,987
[45] Date of Patent: Oct. 13, 1992

[54] HIGHLY CONDUCTIVE ELECTROLYTE COMPOSITES CONTAINING GLASS AND CERAMIC, AND METHOD OF MANUFACTURE

[75] Inventors: Mark C. Hash, Joliet; Ira D. Bloom, Bolingbrook, both of Ill.

[73] Assignee: The United States of America as represented by the United States Department of Energy, Washington, D.C.

[21] Appl. No.: 553,461

[22] Filed: Jul. 17, 1990

[51] Int. Cl.⁵ .................. H01M 8/10; H01M 6/18; C03C 14/00
[52] U.S. Cl. .................. 429/33; 429/193; 501/32; 501/128
[58] Field of Search .................. 429/33, 193; 501/32, 501/128

[56] References Cited

U.S. PATENT DOCUMENTS

| | | | |
|---|---|---|---|
| 3,719,531 | 3/1973 | Dzieciuch et al. | 429/193 X |
| 3,732,056 | 5/1973 | Eddy et al. | 264/332 X |
| 4,237,196 | 12/1980 | Gütmann et al. | 429/193 X |
| 4,365,011 | 12/1982 | Bernard et al. | 264/65 X |
| 4,439,502 | 3/1984 | Bittihn et al. | 429/193 X |
| 4,465,744 | 8/1984 | Susman et al. | 429/191 |
| 4,526,844 | 7/1985 | Yoldas et al. | 429/33 X |
| 4,539,276 | 9/1985 | Harbach | 429/193 X |
| 4,544,614 | 10/1985 | Kucera et al. | 429/193 |

Primary Examiner—Mark L. Bell
Assistant Examiner—Lisa M. Schull
Attorney, Agent, or Firm—James W. Weinberger; Thomas G. Anderson; William R. Moser

[57] ABSTRACT

An electrolyte composite is manufactured by pressurizing a mixture of sodium ion conductive glass and an ionically conductive compound at between 12,000 and 24,000 pounds per square inch to produce a pellet. The resulting pellet is then sintered at relatively lower temperatures (800° C.–1200° C.), for example 1000° C., than are typically required (1400° C.) when fabricating single constituent ceramic electrolytes. The resultant composite is 100 percent conductive at 250° C. with conductivity values of 2.5 to $4 \times 10^{-2}$ (ohm-cm)$^{-1}$. The matrix exhibits chemical stability against sodium for 100 hours at 250° to 300° C.

7 Claims, 1 Drawing Sheet

HIGHLY CONDUCTIVE ELECTROLYTE COMPOSITES CONTAINING GLASS AND CERAMIC, AND METHOD OF MANUFACTURE

CONTRACTUAL ORIGIN OF THE INVENTION

The United States Government has rights in this invention pursuant to Contract No W-31-109-ENG-38 between the U.S. Government and Argonne National Laboratory.

BACKGROUND OF THE INVENTION

1. Field of the Invention

This invention relates to highly conductive electrolyte composites and a method of fabricating highly conductive electrolyte composites and more particularly to fabricating electrolyte composites by combining ionically conductive compounds with ionically conductive soda glasses.

2. Background of the Invention

Research of Na/S and Na/MCl$_2$ (M=Fe or Ni) cells continues in the search for advanced battery designs with improved power density and performance. Both battery types require high surface-area electrolytes for maximum performance.

Crystalline, ionically conductive compounds, such as the beta-aluminas, are the usual electrolytes for the advanced designs. The beta-aluminas are hexagonal structures with the approximate composition $AM_{11}O_{17}$. The mobile ion A is a monovalent ion, such as Na, K, Rb, Ag, Tl or Li, and M is a trivalent ion, such as Al, Fe, or Ga. Related structures, i.e., $\beta'$-alumina and $\beta''$-alumina occur with the approximate formulas $AM_7O_8$ and $AM_5O_8$, respectively. $\beta''$-alumina has extremely high conductivities; on the order of $1.4 \times 10^{-1}$ (ohm-cm)$^{-1}$ at 250° C., for sodium ions.

While the ionically conductive compounds, such as the beta-aluminas, have excellent sodium conductivities, their high sintering temperatures, on the order of 1400° C., makes them difficult and expensive to fabricate into electrolyte structures for batteries. Therefore, the typical techniques of using ionically conductive compounds solely as the constituent for electrolytes is not economically feasible, due to their high-temperature, closed system handling requirements.

To overcome the electrolyte fabrication problems associated with crystalline, ionically conductive compounds, a variety of ionically conductive glasses have been developed, such as those disclosed by U.S. Pat. Nos. 4,544,614 and 4,465,744. These electrolytes exclude crystalline and undissolved constituents, such as the beta-aluminas, from their structures. Despite the exclusion of crystalline material, such as the beta-aluminas, from the general formulas of the ionically conductive glasses disclosed in the above mentioned patents, these glasses exhibit high soda characteristics. As such, the disclosure of U.S. Pat. Nos. 4,544,614 and 4,465,744 are incorporated herein by reference for the high soda glass constituent of the invention.

While U.S. Pat. Nos. 4,544,614 and 4,465,744 are effective for their intended purposes, a need exists for an electrolyte possessing an ionic conductivity closer to that of the beta-aluminas while also possessing the ease of fabrication of glass.

Ideally, an electrolyte composite comprised of an ionically conductive glass and an ionically conductive compound would take advantage of the properties of both materials to provide an economical and low resistance alternative to typical electrolyte structures.

SUMMARY OF THE INVENTION

A principal object of the present invention is to provide a method of fabricating highly conductive electrolyte composites. A feature of the method is the combining of high soda glass with ionically conductive compounds at relatively low temperatures to make a high alkali metal ion transport media. The high sodium ion conductivity of the ionically conductive compound and the ease of fabrication of the glass provides an efficient, economical alternative to typical electrolyte structures.

Another object of the present invention is to provide highly conductive electrolyte composites. A feature of the invention is the combination of ionically conductive glass with ionically conductive compounds such as the beta-aluminas or other sodium ion conductive ceramics. This combination affords an economically designed electrolyte compared to typical electrolytes.

In brief, the objects and advantages of the present invention are achieved by an electrolyte composite and a method of fabricating thereof. An ironically conductive glass is combined with an ionically conductive compound, such as a sodium ion conductive ceramic, at relatively lower temperatures (800° C.-1200° C.) than are typically required (1400° C.) when fabricating single constituent ceramic electrolytes. These materials exhibit a conductivity between 2.5 and $4 \times 10^{-2}$ (ohm-cm)$^{-1}$ at 250° C., and chemical stability against sodium for at least 100 hours at 250 to 300° C. The composite is 100 percent ionically conductive at 250° C.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE INVENTION

Figure 1:
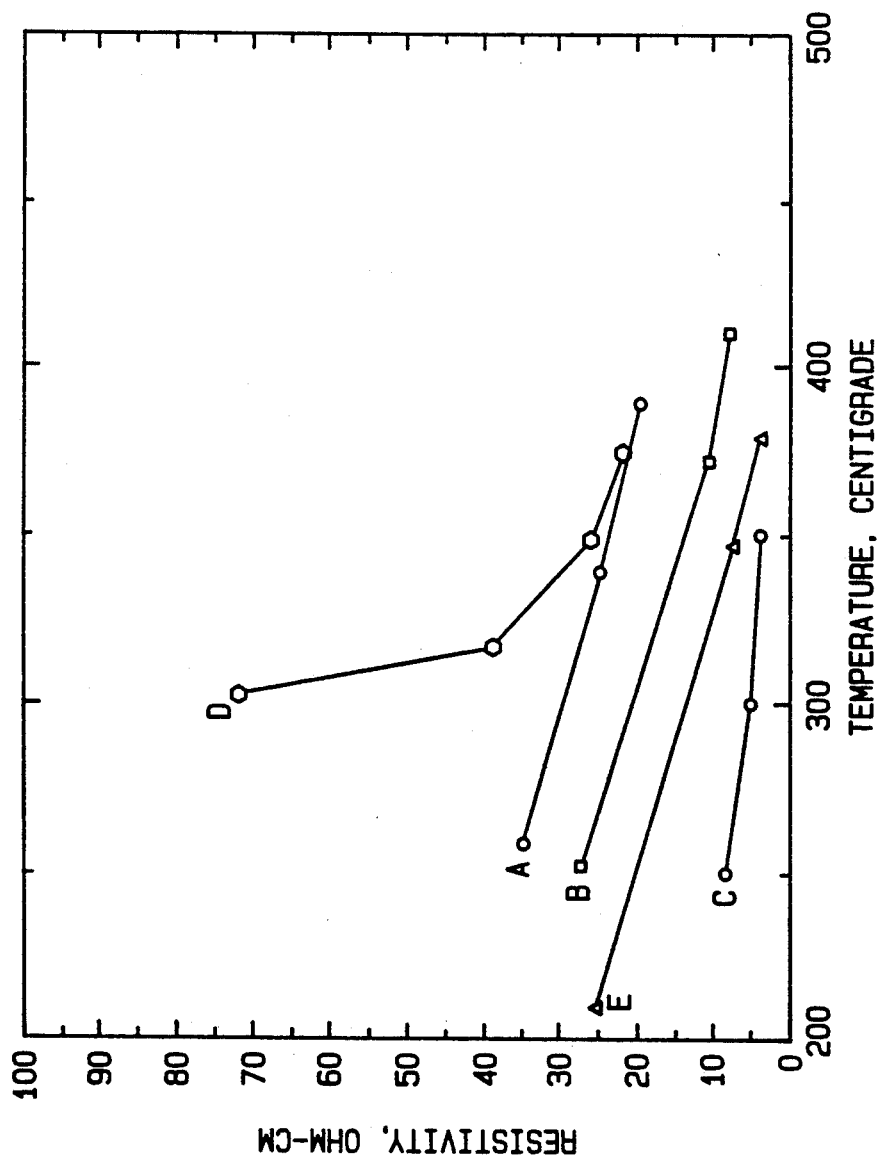
FIG. 1 is a graph showing the resistance, between 200° C. and 400° C., for composites of the invention fabricated by various methods according to the invention and of a $\beta''$-alumina electrolyte.

In accordance with a feature of the invention, the previous technique of sintering at 1400° C. for electrolyte fabrication is avoided by combining a conductive glass with an ionically conductive compound to form a glass matrix containing a high percentage (i.e., between 50 and 70 volume percent) of the ionically conductive compound.

A myriad of ionically conductive compounds could be incorporated into the invention, including the beta-aluminas ($\beta$-alumina, $\beta'$-alumina, and $\beta''$-alumina), the sodium-yttrium oxides, NASICON ceramics and sodium ion conductive ceramics generally. While the inventors chose $\beta''$-alumina as the exemplary ionically conductive compound in the composite fabrication process, it should be understood that these fabrication steps are not limited to $\beta''$-alumina.

The candidate glass should have a high sodium-ion conductivity and should be thermally and chemically compatible with one of the crystalline, ionically conductive compounds, such as the beta-aluminas. For mechanical integrity, the thermal expansion coefficients of the two materials should be close. Furthermore, the glass should only wet the beta-alumina; otherwise, if the interaction is too great, the structure, and therefore the conductivity, of the beta-alumina may be destroyed. As such, the glass preferably is a high soda glass, for example, such as 35 to 45 percent $Na_2O$, 0.5 to 5 percent $Al_2O_3$, with the balance being $SiO_2$. Good results have been achieved using a soda glass having a mole percent composition of 40.88 $Na_2O$, 1.42 $Al_2O_3$ and 57.7 $SiO_2$.

Another candidate for ionically conductive glass is a NASICON material, disclosed in U.S. Pat. No. 4,465,744, which, as noted above, is incorporated herein by reference. The NASICON material has the following general formula $A_{1+x}D_{2-x/3}Si_xP_{3-x}O_{12-2x/3}$, where is an alkali metal identical to that found in the anode of a battery and D is an intermediate of the glass such as zirconium, titanium, germanium, aluminum, antimony, beryllium, zinc and generally the quadrivalent ions of group IV of the periodic table.

Precursor fabrication

Fabrication of the composite ceramic typically involves preparation of the ceramic and glass by drying the powder of the $\beta''$-alumina to remove moisture or residual organic compounds. This drying can be effected at 300° C. under vacuum.

The source, age and purity of $\beta''$-alumina effects the resistivity values of the final composite. For example, as shown in FIG. 1, composites made with newly manufactured $\beta''$-alumina yields resistivity values, indicated by a plot labelled E, closest to those of uncut $\beta''$-alumina, indicated by a plot labelled C, compared to values exhibited by composites incorporating 5-year old $\beta''$-alumina, indicated by plots labelled A, B, and D.

The glass, made in a separate step, is ground, sized and dried before mixing with the $\beta''$-alumina. The glass raw materials, for example $Na_2CO_3$, $Al_2O_3$ and $SiO_2$, are mixed in their proper proportions in a mortar and pestle and are ground together thoroughly. The mixture is then calcined at 860° C. for 16 hours in air. The calcined material is melted at 1100° C. for 10 minutes after which the resulting molten glass is quenched to room temperature.

Upon fabrication, the glass is broken up and sized via standard sieving procedures to achieve a mean particle size of approximately 100 microns ($\mu$). These sized glass particles are then vibratory milled for a predefined time period, such as 2 hours, using $Al_2O_3$ grinding media and methanol to obtain an approximate particle size of $10\mu$. The resulting glass powder is then vacuum dried at 300° C. for a sufficient time to ensure dryness, such as 16 hours.

Composite Fabrication

The prepared glass is then combined with the previously prepared $\beta''$-alumina in the ratio of 50:50 weight percent using a mortar and pestle in a helium atmosphere.

The mixture is then cold pressed to form a pellet. A variety of pellet sizes and shapes can be obtained, depending on the pressure used during the cold press process and on the final application of the electrolyte structure. As shown by the plots A, B and D in FIG. 1, good results are achieved at 12,000 pounds per square inch (12 ksi) and 24 ksi.

The sintering of the pellets is effected through heating. A thermal schedule is employed whereby the pellets are heated for a few hours at moderate temperatures, for example between 200° C. and 400° C., to minimize any water content in the pellet. This is followed by sintering at temperatures ranging from 800° C. to 1200° C., preferably at 1000° C., for a period of time ranging from 1 to 20 hours and preferably at 16 hours. The following heating schedule employed by the inventors for pellet sintering yields good results:

1. Heat the pellet at 1° C./minute to 300° C.
2. Hold at 300° C. for 16 hours.
3. Heat at 8° C./minute to 1000° C.
4. Furnace cool the sintered product.

FIG. 1 shows that pellets produced at different cold pressures yielded electrolyte composites exhibiting different resistivities. Composites produced from pellets formed under 12 ksi, as depicted in plot B of FIG. 1, for example, exhibited lower resistivities (23 ohm-cm at about 300° C.) than composites produced under 24 ksi, D (70 ohm-cm at about 300° C.). Still different resistivity values (31 ohm-cm at about 300° C.), A, were exhibited when, in addition to subjecting presintering composite mixtures to 12 ksi, the pellets were sealed in sintering sand to prevent loss of $Na_2O$ during heating.

Excellent resistivity values (15 ohm-cm at about 300° C.) E, were obtained when using newly manufactured $\beta''$-alumina compared to other composites A, B, and D, which incorporated aged $\beta''$-alumina.

Overall, the resulting composite displays conductivity values of 2.4 to $4\times10^{-2}$ (ohm-cm)$^{-1}$, which is within a factor of 4 to 6 of that of $\beta''$-alumina, noted earlier. These relatively high conductivity values viz., uncut $\beta''$-alumina, can be attributed to the extremely high, final stoichiometric values for $Al_2O_3$ of approximately 45 to 50 mole percent in the composite. For example, a 65 volume percent of $\beta''$-alumina corresponds to a 47 mole percent of $Al_2O_3$ in the final composite structure.

Chemical stability of these materials against sodium also has been demonstrated for at least 100 hours at 250°-300° C. Further, the electrolyte composite was 100 percent ionically conductive at low temperatures, such as 250° C.

While the invention has been described with reference to details of the illustrated embodiment, these details are not intended to limit the scope of the invention as defined in the appended claims.

What is claimed is:

1. A method of fabricating electrolyte composites comprising:
   mixing sodium-ion conductive glass with an ionically conductive compound in a 50:50 weight percent ratio to produce a mixture where the sodium ion conductive glass wets the ionically conductive compound;
   shaping the mixture by pressing between 12,000 pounds per square inch and 24,000 pounds per square inch; and
   heating the mixture at a temperature less than 1400° C.

2. A method as recited in claim 1 wherein the conductive compound is selected from the group consisting of $\beta$-alumina, $\beta'$-alumina, $\beta''$-alumina, sodium yttrium oxide, NASICON ceramic and combinations thereof.

3. A method as recited in claim 1 wherein the conductive compound is $\beta''$-alumina.

4. A method as recited in claim 1 wherein said temperature is provided in a range between 800° C. and 1200° C.

5. A method as recited in claim 1 wherein the mixture is heated at 1000° C.

6. A method as recited in claim 1 wherein the conductive glass is a high soda glass selected from the group consisting of $(Na_2O)(Al_2O_3)(Si_2O)$, $(Na_2O)(ZrO_2)$, $(SiO_2)$, and combinations thereof.

7. A method as recited in claim 1 wherein the conductive glass comprises 35 to 45 mole percent $Na_2O$, 0.5 to 5 percent $Al_2O_3$ and the remainder $SiO_2$.

* * * * *